United States Patent [19]

Girardin

[11] 4,367,392
[45] Jan. 4, 1983

[54] AUTOMATIC ELECTRODE WIRE RETHREADING DEVICE FOR TRAVELLING WIRE EDM APPARATUS

[75] Inventor: Roger Girardin, Vernier, Switzerland

[73] Assignee: Ateliers des Charmilles S.A., Geneva, Switzerland

[21] Appl. No.: 208,923

[22] Filed: Nov. 21, 1980

[30] Foreign Application Priority Data

Jan. 8, 1980 [CH] Switzerland ............................ 101/80

[51] Int. Cl.³ .............................................. B23P 1/12
[52] U.S. Cl. ................................................. 219/69 W
[58] Field of Search ........................... 219/69 W, 69 M

[56] References Cited

U.S. PATENT DOCUMENTS

| | | | |
|---|---|---|---|
| 3,822,374 | 7/1974 | Ullmann et al. | 219/69 W |
| 3,987,270 | 10/1976 | Ullmann et al. | 219/69 W |
| 4,242,559 | 12/1980 | Roemer et al. | 219/69 W |

FOREIGN PATENT DOCUMENTS

| | | |
|---|---|---|
| 2440564 | 3/1975 | Fed. Rep. of Germany . |
| 2466309 | 4/1981 | France . |
| 54-141490 | 2/1979 | Japan ................................ 219/69 W |

*Primary Examiner*—C. C. Shaw
*Attorney, Agent, or Firm*—Hauke and Patalidis

[57] ABSTRACT

In a travelling wire EDM apparatus, the electrode tool in the form of a wire used for cutting an electrode workpiece is passed through a first zone in which the wire is straightened, preferably by exerting a pull on the wire while the wire is heated. The wire is subsequently cut-off at the bottom of the first zone, and the straightened portion of the wire is then threaded by a carriage through a hole pre-drilled in the workpiece, or through a cut in the workpiece in the event that the wire ruptures during machining, until the end of the wire is engaged in the wire conveyor mechanism.

4 Claims, 1 Drawing Figure

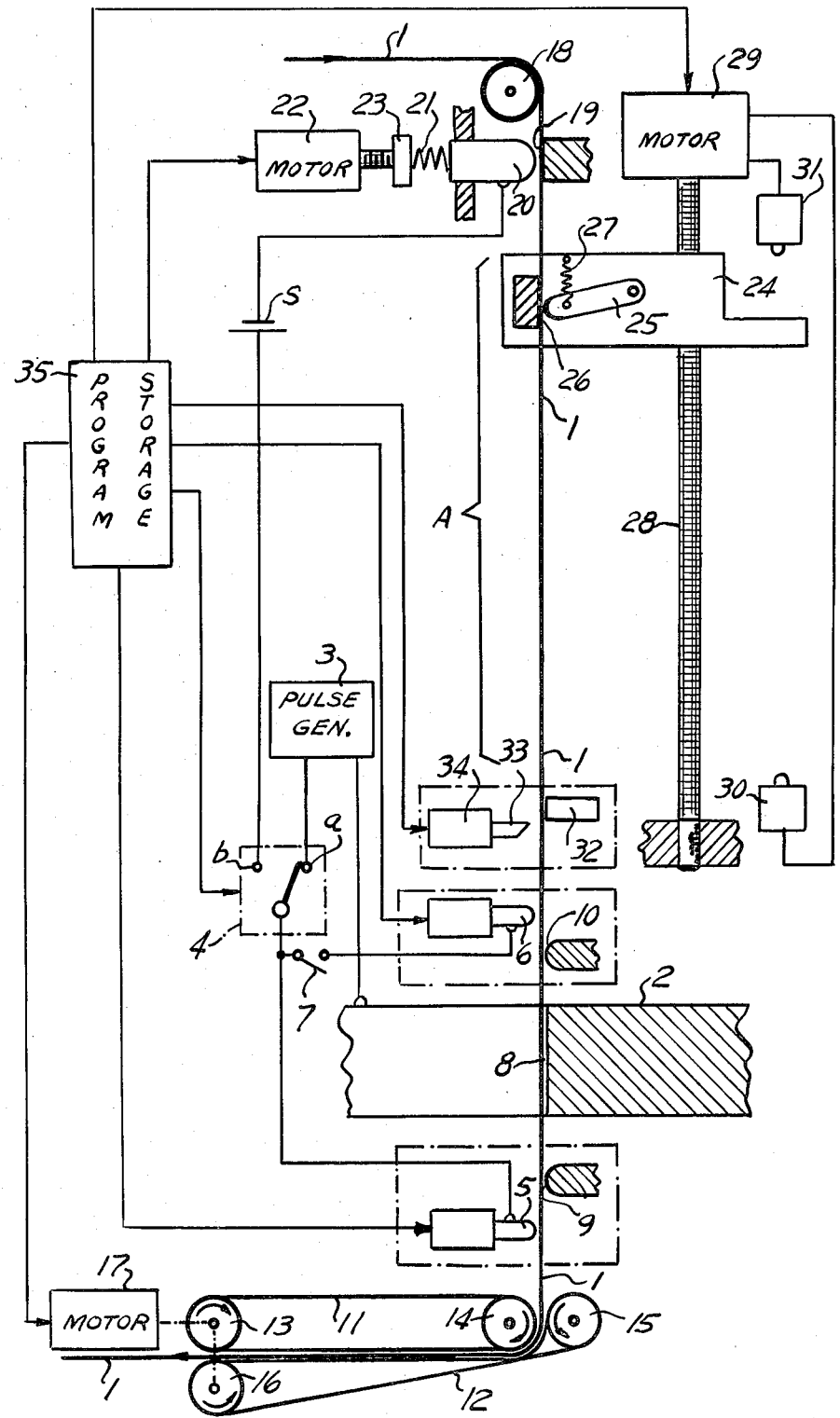

AUTOMATIC ELECTRODE WIRE RETHREADING DEVICE FOR TRAVELLING WIRE EDM APPARATUS

BACKGROUND OF THE INVENTION

The invention relates in general to travelling wire EDM apparatus wherein an electrode workpiece is cut by electrical discharges by means of an electrode tool in the form of a wire, and more particularly the invention relates to a travelling wire electrode rethreading device.

In travelling wire EDM apparatus the electrode wire, longitudinally displaced through the machining zone formed between the electrode wire and the electrode workpiece, is stretched between two guide members, the guide members being displaced laterally relative to the electrode workpiece according to a predetermined cutting path. At the end of a machining pass, the wire is cut to permit removing one of the machined parts and, prior to machining the next part, the wire must be rethreaded through a pre-drilled hole previously formed in the workpiece.

Known devices and methods for effecting automatic rethreading of the wire through the pre-drilled hole consist in, after cutting-off the wire end, pulling the wire through the pre-drilled hole or pushing the wire through a sleeve disposed in the pre-drilled hole and, subsequently, tieing together the two ends of the wire. Such known arrangements are complicated, they require a large number of consecutive steps, and the mechanisms accomplishing those steps are cumbersome and costly.

The disadvantages of the prior art are eliminated by the apparatus of the invention, wherein the electrode wire is threaded consecutively through a first zone in which it is straightened, and through a second zone in which machining is effected. The apparatus of the invention particularly provides means disposed in the first zone for cutting-off the wire in the lower portion of the first zone, and for pushing the straightened end of the wire through the second zone, disposed in alignment with the first zone, until the end of the wire is captured by a wire conveying mechanism disposed downstream of the second zone.

Feeding the wire from top to bottom, first through the zone where it is straightened and cut-off, and subsequently through the machining zone and into an ejection zone, permits to rethread the wire with high precision without requiring guiding the wire and without the necessity of connecting and tieing the two wire ends.

The many objects and advantages of the present invention will become apparent to those skilled in the art when the following description of the best mode contemplated for practicing the invention is read in conjunction with the accompanying drawing wherein:

BRIEF DESCRIPTION OF THE DRAWING

The single FIGURE of the drawing illustrates, schematically and for illustrative purpose, a structure for an automatic rethreading device for EDM travelling wire apparatus according to the present invention.

DETAILED DESCRIPTION OF THE PREFERRED EMBODIMENT

As schematically illustrated in the drawing, the apparatus of the invention comprises an electrode tool 1 in the form of a wire and an electrode workpiece 2, the electrodes being displaced one relative to the other in a plane perpendicular to the plane of the drawing by means of a pair of servo motors, not shown, controlled by a numerical control device, not shown, as those elements are well known in the art.

The machining pulses are provided by a pulse generator 3 having one of its terminals connected to the workpiece 2 and the other terminal connected to the wire 1 through a relay switch 4 and a pair of retractable contacts 5 and 6. The contact 6 may be disconnected from the pulse generator 3 by means of a switch 7. The position of the wire 1, in the machining zone 8 formed between the workpiece 2 and the wire 1, is determined by a pair of guiding surfaces 9 and 10. The wire 1 is applied against the guiding surfaces 9 and 10 respectively by the contact fingers 5 and 6, which are illustrated in the drawing in their retracted position. The end of the wire 1 is subsequently captured between and pulled by a pair of conveyor belts 11 and 12 winding around pulleys 13 and 14 and pulleys 15 and 16, respectively. The pulleys 13 and 16 are driven in unison by a variable speed electric motor 17.

The wire 1, obtained from an appropriate supply spool, not shown, winds around a pulley 18 and is passed through a mechanical brake comprising a support surface 19 and a plunger 20, the plunger 20 being biased towards the support surface 19 by a spring 21 whose compression is adjustable by means of an electric motor 22 extending or retracting a jackscrew 23. The plunger 20 is, in addition, used for supplying electrical current to the wire 1 for heating the wire for the purpose of straightening it within a zone A. For that purpose, the plunger 20 is connected to one of the terminals of a source S of electric current, the other terminal of the electrical current source S being connected to the contact 5 or to the contact 6, or to both, through the switch 4.

The wire 1 is fed vertically by a carriage 24 on which is mounted a clamping lever 25 whose free end applies the wire against a support surface 26 under the pulling action of a spring 27. The carriage 24 is mounted reciprocable parallelly to the wire 1 by means of a master screw 28 driven in rotation by a motor 29. The travel of the carriage 24 is limited by limit switches 30 and 31. An automatic wire cutter comprising a stationary member 32 and a movable knife 33 reciprocated by a servo motor 34 is disposed at the lower end of the zone A in which the wire 1 is straightened by applying a pull on the wire while being heated. The pull on the wire 1 is effected as the result of the braking action on the wire effected by the braking mechanism consisting of the support surface 19, the plunger 20 and the pressure spring 21 whose compression is adjusted by the jackscrew 23 driven by the motor 22. Heating of the wire 1 is effected by the electric current flowing through the wire from the electric current source S between the upper electrical contact 20 and the lower contact 5 or 6, when the relay switch 4 is operated to close the circuit through the switch terminal b.

The automatic threading of the wire 1 is controlled by a program stored in a storage 35 having several outputs. One output is connected to the motor 29 driving the carriage 24, another is connected to the motor 22 controlling the amount of braking of the mechanical brake, another is connected to the motor 34 operating the reciprocable knife 33 of the wire cutter, other outputs are connected to the motors or solenoids controlling the reciprocation of the retractable contacts 5 and 6, while other outputs are connected to the relay switch 4 and another output is connected to the drive motor 17 of the wire conveyor.

The sequence of steps for threading the wire, as controlled by the program stored in the storage 35, is as follows:

At the end of a machining operation, the motor 17 decreases the speed at which the wire 1 is longitudinally fed and the motor 22 changes the pull exerted on the wire, for example by decreasing the pull. Subsequently, the relay switch 4 is operated such that its movable contact is connected to the terminal b such as to connect the electric current source S across the contacts 20 and 5. Electrical current can also flow through the contact 6 if the switch 7 is closed. The program storage 35 allows the current from the electrical current source S to flow through the wire during a predetermined time interval, for example for about 20 seconds, and subsequently interrupts the heating of the wire by activating the relay switch 4 such as to return its movable contact in engagement with the terminal a.

The contact fingers 5 and 6 are retracted and the reciprocable knife 33 is actuated by the motor 34 to cut-off the wire.

A few seconds later, the motor 17 returns the wire conveyor to its normal speed, and the cut-off end portion of the wire is evacuated.

A new workpiece is mounted on the machine head and positioned such as to align a pre-drilled hole in the workpiece 2 with the end of the wire 1. The motor 29 is started to drive the carriage 24 downwardly, the wire 1 being caught between the end of the lever 25 and the support surface 26, and pass the straightened portion of the wire 1 through the pre-drilled hole until it is caught between the conveyor belts 11 and 12 driven by the motor 17. Upon tripping the lower limit switch 30, the rotation of the carriage drive motor 29 is reversed, thus bringing the carriage 24 to its upper position, where it is stopped upon tripping the upper limit switch 31. The action of the one-way drive lever 25 permits the wire to pass freely between the end of the lever and the support surface 26, and machining of the new workpiece can be started. If during machining, the wire 1 is accidentally ruptured, the automatic rethreading device of the invention can effectuate rethreading of the wire through the slot cut in the workpiece 2 by effecting the hereinbefore described threading steps. However, such an operation may require placing a swingable finger-like clamp, not shown, between the reciprocable knife 33 and the workpiece 2 for disposal of the length of wire between the ruptured end and the cut-off end of the wire.

Having thus described the invention by way of an example of structure best adapted to accomplish the objects of the invention, modifications whereof will be apparent to those skilled in the art, what is claimed as new is as follows:

1. In a travelling wire EDM apparatus wherein an electrode workpiece is cut by an electrode tool consisting of a wire travelling sequentially through a wire straightening zone and a machining zone, said straightening zone being disposed in alignment with said machining zone, and a wire conveying mechanism disposed beyond said machining zone, the improvement for automatic wire rethreading means which comprises means in said straightening zone for heating said wire and means for exerting a pull on said wire while being heated, said means for exerting a pull on said wire being said wire conveying mechanism, means for cutting off said wire at the bottom of said straightening zone, means for grasping said wire at the top of said straightening zone and for pushing a straightened end portion of said wire through said machining zone for engaging the end of said wire in said wire conveyor mechanism for feeding said wire through said machining zone while simultaneously exerting said pull on said wire.

2. The improvement of claim 1 wherein said heating means comprises means for passing electrical current through said wire.

3. In a travelling wire EDM apparatus wherein an electrode workpiece is cut by an electrode tool consisting of a wire travelling sequentially through a wire straightening zone and a machining zone, said straightening zone being disposed in alignment with said machining zone, and a wire conveying mechanism disposed beyond said machining zone, an automatic wire rethreading mechanism comprising means in said straightening zone for heating said wire and means for exerting a pull on said wire while being heated, said means for exerting a pull on said wire being said wire conveying means, means for cutting-off said wire at the bottom of said straightening zone, means for grasping said wire at the top of said straightening zone and for pushing a straightened end portion of said wire through said machining zone for engaging the end of said wire in said wire conveyor mechanism for feeding said wire through said machining zone by exerting a pull on said wire, and means for applying a variable braking action on said wire, said means for applying a variable braking action on said wire being disposed ahead of said straightening zone, and wherein said wire conveyor mechanism disposed beyond said machining zone has a variable speed for varying the pull exerted on said wire and the speed of motion of said wire while said wire is straightened in said straightening zone.

4. The improvement of claim 3 wherein said heating means comprises means for passing electrical current through said wire.

* * * * *